United States Patent
Sethi et al.

(10) Patent No.: US 12,537,748 B2
(45) Date of Patent: Jan. 27, 2026

(54) OFFLOAD AND SHARE DEEPER HARDWARE ANALYSIS FOR MODULAR CHASSIS MANAGEMENT

(71) Applicant: Dell Products L.P., Round Rock, TX (US)

(72) Inventors: Parminder Singh Sethi, Ludhiana (IN); Lakshmi Saroja Nalam, Bangalore (IN); Praveen Kumar, Noida (IN)

(73) Assignee: Dell Products L.P., Round Rock, TX (US)

( * ) Notice: Subject to any disclaimer, the term of this patent is extended or adjusted under 35 U.S.C. 154(b) by 85 days.

(21) Appl. No.: 18/422,901

(22) Filed: Jan. 25, 2024

(65) Prior Publication Data
US 2025/0247302 A1  Jul. 31, 2025

(51) Int. Cl.
*G06F 15/173* (2006.01)
*H04L 41/16* (2022.01)
*H04L 67/1008* (2022.01)

(52) U.S. Cl.
CPC .......... *H04L 41/16* (2013.01); *H04L 67/1008* (2013.01)

(58) Field of Classification Search
None
See application file for complete search history.

(56) References Cited

U.S. PATENT DOCUMENTS

2019/0220703 A1* 7/2019 Prakash ................. G06V 10/95

* cited by examiner

*Primary Examiner* — Wing F Chan
*Assistant Examiner* — Andrew Woo
(74) *Attorney, Agent, or Firm* — Chamberlain, Hrdlicka, White, Williams & Aughtry; Aly Z. Dossa (57) ABSTRACT

A modular chassis manager that implements a trained model for hardware prediction failure is programmed to: initiate a training of a machine learning algorithm; and in response to the initiating: make a first determination, based on an offloading policy, that the training is to be offloaded to one of the plurality of edge devices, wherein the offloading policy is generated by the modular chassis manager using system topology information obtained from the edge network, based on the first determination, select an edge device of the plurality of edge devices using the offloading policy, transfer training data to the edge device, instruct the edge device to perform the training using the training data to generate a trained model, and obtain the trained model from the edge device.

17 Claims, 7 Drawing Sheets

OFFLOAD AND SHARE DEEPER HARDWARE ANALYSIS FOR MODULAR CHASSIS MANAGEMENT

BACKGROUND

In a computing environment, the training of models to predict failure of devices on a network is commonly used. A modular chassis manager on the computing environment may allow for devices on a network to communicate and share trained prediction models.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system including an edge network and a modular chassis manager in accordance with one or more embodiments of the invention.

FIG. 1.2 shows a diagram of an edge device in accordance with one or more embodiments of the invention.

FIG. 1.3 shows a diagram of a modular chassis manager in accordance with one or more embodiments of the invention.

FIG. 2.1 shows a flowchart of a method for generating an offloading policy in accordance with one or more embodiments of the invention.

FIG. 2.2 shows a flowchart of a method for offloading training in accordance with one or more embodiments of the invention.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regards to any other figure. For brevity, descriptions of these components will not be repeated with regards to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of the figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to system and methods for offloading and distributing the failure prediction training of machine learning models across a network of edge devices (132, 134) in a system for modular chassis management. More specifically, a modular chassis manager obtains information about all devices in the system, including the network of edge devices (132, 134) (also referred to as an edge network), in order to understand the structure of the system, and generate an offloading policy to execute the offloading of the model training workload to edge devices (132, 134) as determined by the offloading policy.

One or more embodiments of the invention improves upon the traditional method of performing training for failure prediction models at a hardware level for devices in a global data system and/or a local data system by the modular chassis manager, as current implementations do not include methods for offloading this failure prediction training, and requires the modular chassis manager to consume an excessive amount of computing resources that could be used to perform other tasks.

Figure 11:
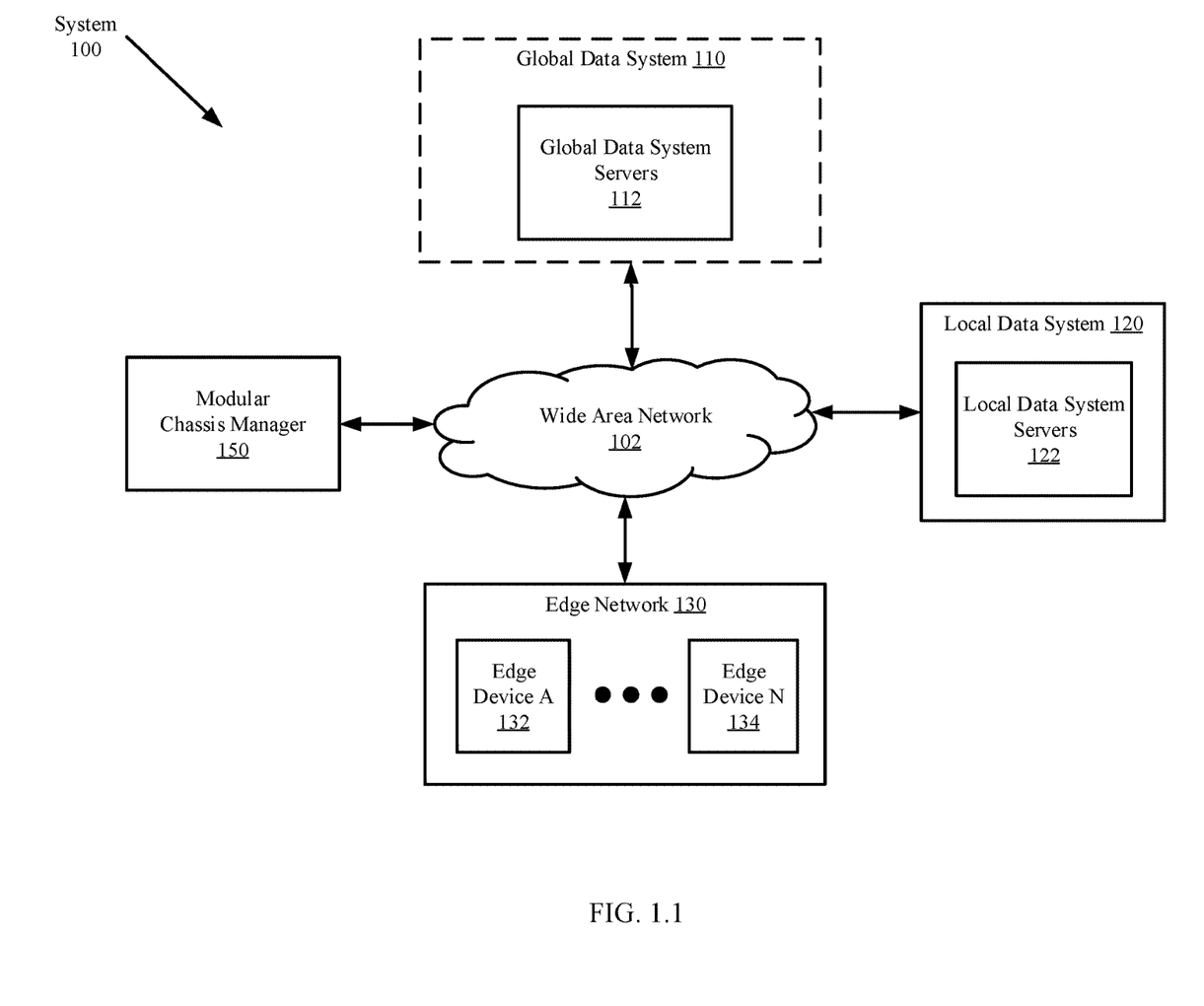

FIG. 1.1 shows a diagram of a system in accordance with one or more embodiments of the invention. The system may include a wide area network (WAN) (102), a client (104), a global data system (110), a local data system (120), an edge network (130), and a modular chassis manager (150). The system may include any number of edge networks (130) without departing from the invention. The system may include additional, fewer, and/or other components without departing from the invention. Each of the components in the system may be operatively connected via any combination of wireless and/or wired networks, e.g., the WAN (102).

In one or more embodiments, the WAN (102) is the wide area network that performs the functionality of allowing communication between components of the system described throughout this application. The WAN (102) may include any number of devices within any components of the system, as well as devices external to or between such components of the system. The WAN (102) provides the operative connectivity between the client (104), global and local data systems (110, 120), each of the edge devices (132, 134) in the edge network (130), and the modular chassis manager (150). Each of the aforementioned system components connected by the WAN (102) will be described in detail below.

In one or more embodiments, the global data system (110) may include a plurality of global data system servers (112) without departing from the invention. The global data system servers (112) may provide computer-implemented services to users. The global data system (110) may operate in a cloud environment, accessible by the edge network (130), the local data system (120), the modular chassis manager (150), and/or any other entity via the wide area network (102). In one or more embodiments, the computer-implemented services provided by the global data system servers (112) include data storage, data processing, data collection (e.g., using the edge network (130)), and application execution. Other computer-implemented services may be offered by the global data system (110) without departing from the invention.

In one or more embodiments, the local data system (120) may include a plurality of local data system servers (122) without departing from the invention. The local data system (120), similar to the global data system (110), may provide computer-implemented services to users. In contrast to the global data system (110), the local data system (120) may include direct connections to the edge network (130). Further, the local data system servers (122) may include hardware managed by the modular chassis manager (150). The modular chassis manager (150) may monitor the operation of the local data system (120) and the hardware therein by performing maintenance services and load balancing operations on the local data system servers (122) and by performing hardware failure predictions on the local data system servers (122).

Figure 4:
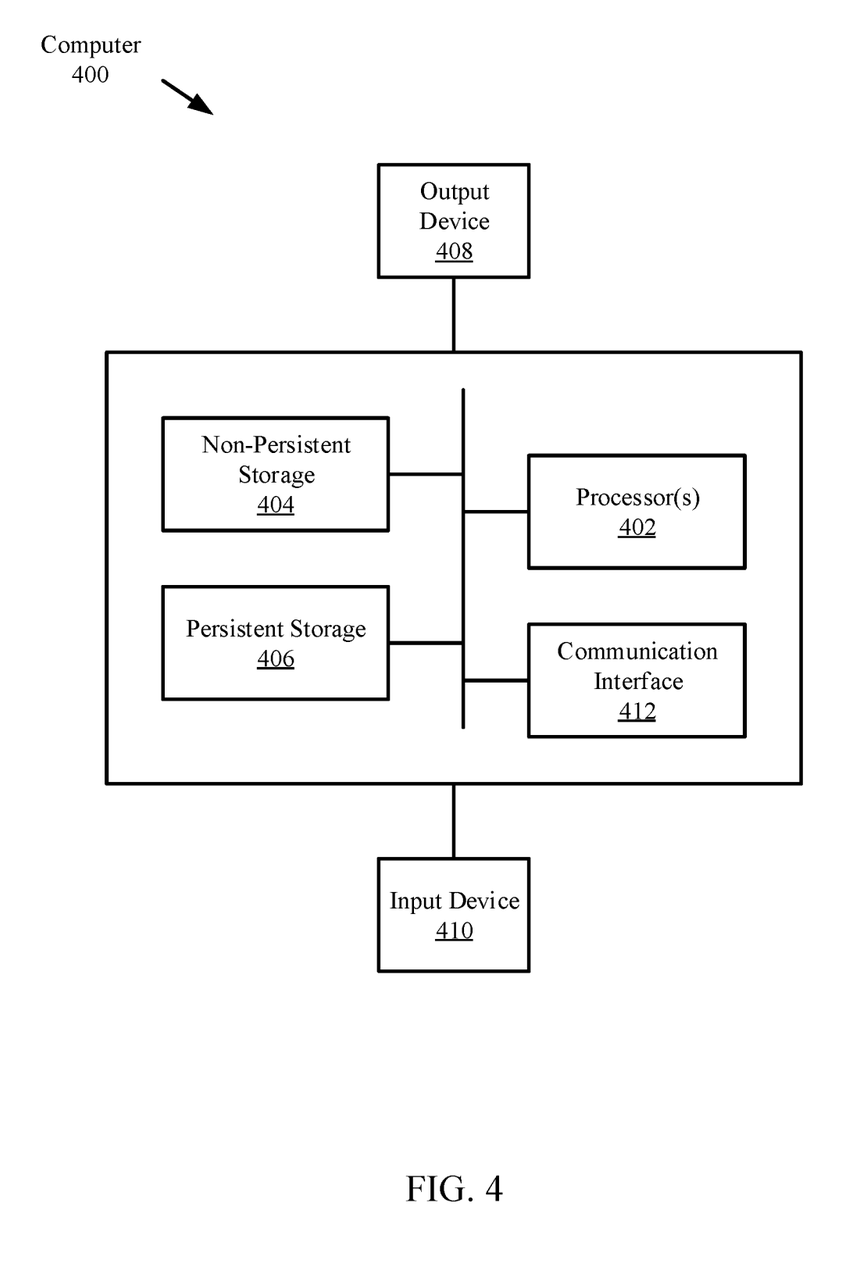
FIG. 4 shows a diagram of a computing device in accordance with one or more embodiments of the invention.

In one or more embodiments, each of the local data system servers (122) is implemented as a computing device (see e.g., FIG. 4). The computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device, it will cause the computing device to perform the functionality of the local data system servers (122) as described throughout this application.

Figure 12:
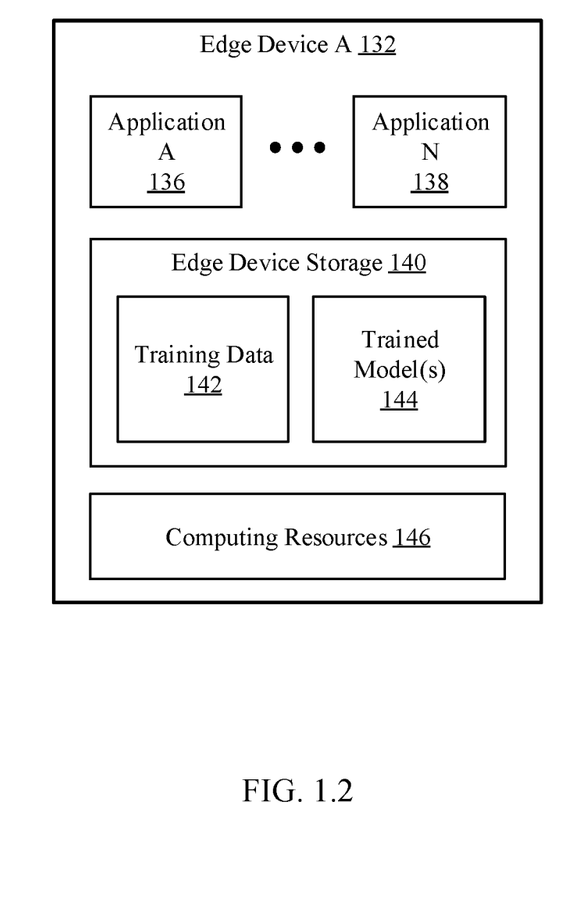

In one or more embodiments, the edge network (130) may be a data architecture which may include a plurality of edge devices (132, 134). An edge network (130) may be implemented on a system with the intention of distributing the processing workload such as the training for the hardware failure prediction from the modular chassis manager (150). A plurality of edge devices (132, 134) may exist on the edge network (130). Examples of an edge device may include, but are not limited to, a smartphone, a laptop, a tablet, a sensor, a router, a WAN access device, etc. An edge device is not limited to the aforementioned examples and may be another type of device without departing from the scope of the invention. Additional details for the functionality of an individual edge device (132, 134) may be found, for example, in FIG. 1.2.

In one or more embodiments, each edge device (132, 134) is implemented as a computing device (see e.g., FIG. 4). The computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device, it will cause the computing device to perform the functionality of the edge devices (132, 134) as described throughout this application.

In one or more embodiments, the modular chassis manager (150) is implemented as a system management hardware with the functionality to manage multiple computing devices on a chassis. The modular chassis manager (150) may have persistent memory that has the capability to store sensor data for the hardware on the chassis, operating system and application data, resource usage data, and event logs for events taking place on the chassis and the local data system servers (122). The modular chassis manager (150) includes functionality to communicate between the edge network (130) and the local data system (120) in order to gather information on the activity of the devices and their connectivity to the network. In the context of this invention, the modular chassis manager (150) further includes functionality to perform failure prediction of the local data system (120) at a hardware level as well as load balancing analysis.

Figure 13:
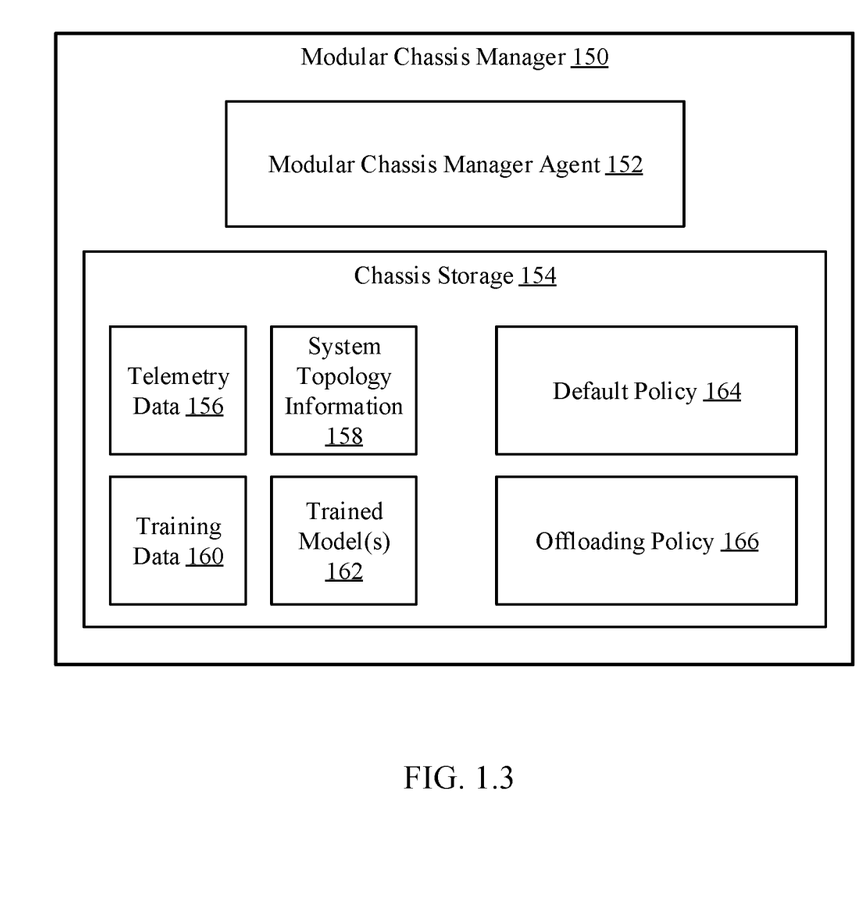

In one or more embodiments, the modular chassis manager (150) performs an analysis of the hardware (including, but not limited to, edge devices (132, 134) on an edge network (130)) in order to understand the distributed workload across the edge devices (132, 134). Based on this workload, the modular chassis manager (150) includes functionality to redistribute the workload to other edge devices (132, 134) if need be. The workload on the devices may include, but is not limited to, a training procedure for a prediction algorithm in order to produce one or more trained models. Additional details for the components of the modular chassis manager, including the trained model(s), can be found, for example, in FIG. 1.3.

Turning now to FIG. 1.2, FIG. 1.2 shows a diagram of an individual edge device (132) in accordance with one or more embodiments of the invention. The edge device (132) of FIG. 1.2 may be an embodiment of an edge device (132, 134, FIG. 1.1) discussed above. The edge device may include a plurality of applications (136, 138), edge device storage (140), and other computing resources (146). The edge device (132) may include additional, fewer, and/or different components without departing from the invention. Each of the aforementioned components of the edge device (132) is discussed below.

In one or more embodiments, the applications (136, 138) refer to at least one application that may exist on the edge device (132) and may perform a variety of functionalities for the edge device. Functionalities of the applications may include a plurality of different tasks, including but not limited to any number of software, data managers, media players, data collection (e.g., from sensors of the edge device (132)) etc.

In one or more embodiments, edge device storage (140) refers to the storage system within each edge device on an edge network (130, FIG. 1.1). The type of storage(s) on each edge device is dependent on the type of edge device discussed previously (132, 134, FIG. 1.1). Edge device storage (140) may include training data (142) and trained model(s) (144). The edge device storage (140) may include additional, fewer, and/or different components without departing from the invention. Each of the aforementioned components of the edge device storage (140) is discussed below.

Figure 22:
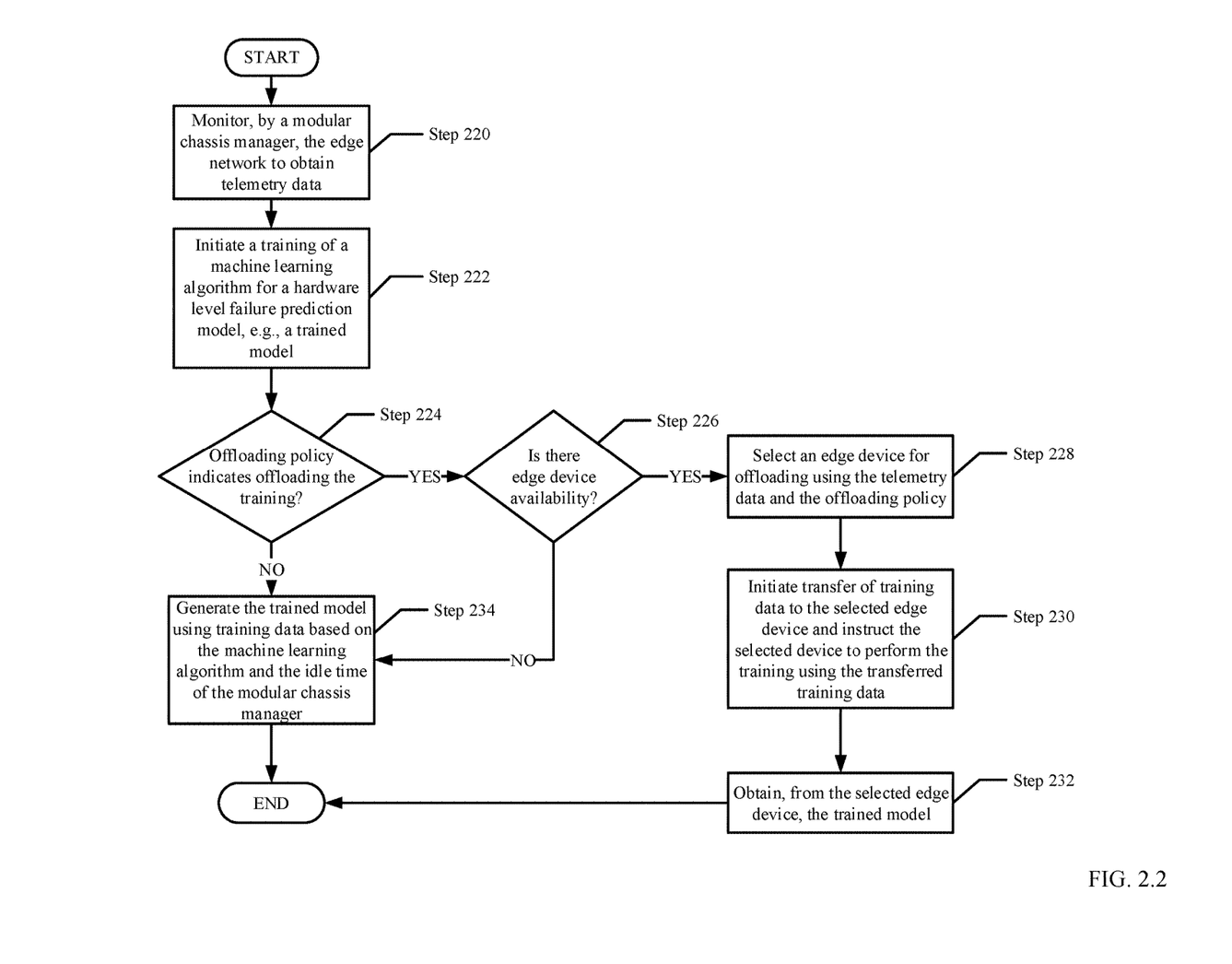

In one or more embodiments, the training data (142) in the edge device storage (140) may refer to information about the system needed by the edge device in order to conduct the training process described below in FIG. 2.2. The training data (142) in the edge device may be training data (see e.g. 162, FIG. 1.3) received from the modular chassis manager (150) in the offloading process elaborated upon below in FIG. 2.2. The training data required to produce a trained model for the hardware failure prediction model may include, but is not limited to, information about previous hardware failures on the edge device.

In one or more embodiments, the trained model(s) (144) in the edge device storage (140) may refer to one or more failure prediction models generated by an edge device (132).

Edge devices (132, 134) may generate trained model(s) (144) when the modular chassis manager (150) offloads the training to the edge device (132) in accordance with an offloading policy implemented by the modular chassis manager (150). The trained model(s) (144) generated by edge devices (132, 134) on an edge network may be shared with the modular chassis manager (150). The trained model(s) (144) may be generated in accordance with at least a portion of the method of FIG. 2.2.

In one or more embodiments, computing resources (146) may refer to hardware or software elements of the edge device (132) that may be available or unavailable to perform tasks and/or used to execute the applications (136, 138). Computing resources (146) may include, but are not limited to, resources such as volatile storage, persistent storage, CPU usage, GPU usage, power, and networking interfaces. The computing resources (146) available to each edge device (132) may be dependent on the workload on the device at any given time, discussed at length below in FIG. 2.2, and the type of edge device, discussed previously in FIG. 1.1.

FIG. 1.3 shows a diagram of the modular chassis manager (150) in accordance with one or more embodiments of the invention. The modular chassis manager (150) of FIG. 1.3 may be an embodiment of a modular chassis manager (150, FIG. 1.1) discussed above. The modular chassis manager may include a modular chassis manager agent (152) and chassis storage (154). The modular chassis manager (150) may include additional, fewer, and/or different components without departing from the invention. Each of the aforementioned components of the modular chassis manager (150) is discussed below.

In one or more embodiments, the modular chassis manager agent (152) includes the functionality to generate an offloading policy for offloading the training of hardware failure prediction models as discussed throughout this disclosure. The modular chassis manager agent (152) may analyze the devices and the network in the system of FIG. 1.1 to identify the availability of the edge devices (132, 134) in the edge network (130, FIG. 1.1) discussed above. The analysis may be used to determine if there is a need to offload from the modular chassis manager, and reassigning tasks from the modular chassis manager to the edge devices (132, 134) on the edge network. The modular chassis manager agent (152) may include additional, fewer, and/or different functionalities without departing from the scope of the invention.

In one or more embodiments, chassis storage (154) may store a variety of information about the system described in FIG. 1.1 and its processes. The chassis storage may include telemetry data (156), system topology information (158), training data (160), at least one trained model(s) (162), a default policy (164), and an offloading policy (166). The chassis storage (154) may include additional, fewer, and/or different components without departing from the invention. Each of the aforementioned components of the chassis storage (154) is discussed below.

In one or more embodiments, the telemetry data (156) may include information about the operation (e.g., workload, available resources, etc.) of edge devices (132, 134) during a period of time. The modular chassis manager (150) may gather information on how the edge devices (132, 134) in the edge network (130) function, including which edge devices (132, 134) are available or unavailable, or idle or active. The telemetry data may also include information on the previous offloading processes done by the modular chassis manager (150) in the system.

In one or more embodiments, system topology information (158) refers to information about the organization and structure of the system of FIG. 1.1. In the context of this invention, system topology information (158) refers to how the edge devices (132, 134) (132, 134, FIG. 1.1) are organized and utilized on the edge network (130, FIG. 1.1). System topology information (158) may include content such as the layout of the edge network, a number of hops used to communicate between two edge devices, which edge devices (132, 134) are active or on standby, the workload for the edge devices, computer resource usage, etc. The system topology information of a system may include other information about the system without departing from the context of this invention.

In one or more embodiments, the training data (160) in the chassis storage (154) may refer to a dataset used for the training of the trained model(s) (144). The training data (160) may include information about the system needed by the chassis manager in order to conduct the training process described below in FIG. 2.2. Training data used to produce a trained model for the hardware failure prediction model may include but is not limited to: information about previous hardware failures on the local data system, the local data system servers, the hardware and software operating on each of the local data system servers, a time to failure of each of the hardware and software, and a workload of each local data system server. The training data (160) may be sent to the edge devices (132, 134) if training is offloaded to them in the process described in FIG. 2.2.

In one or more embodiments, the trained model(s) (162) in the chassis storage (154) refer to hardware failure prediction models generated by either the modular chassis manager itself or any edge device on the edge network that may be managed by the modular chassis manager. The modular chassis manager may also obtain any trained model (144, FIG. 1.2) that is generated by an edge device (132, FIG. 1.2).

In one or more embodiments, the default policy (164) includes initial rules for offloading the training by modular chassis manager. The default policy (164) may be determined by an administrator (not shown). The default policy (164) may include a set of conditions required for offloading from the modular chassis manager (150) to any selected edge node(s) to occur.

In one or more embodiments, the offloading policy (166) refers to the policy generated by the modular chassis manager agent (152). The offloading policy (166) may include a set of conditions required for offloading the training by the modular chassis manager (150) to any selected edge devices. The offloading policy rules generated for an edge network may be based on the system topology information (158) of the edge network and the local data system(s) of the system. Offloading policy rules may also be determined using the workload and availability of the edge devices, and computing resource availability. The offloading policy (166) may include conditions which encourage offloading of the training process when the workload on the modular chassis manager (150) is determined to reach a specified threshold. Further, the conditions may specify limiting offloading when the transfer of training data to other edge devices would be inefficient. The offloading policy (166) may also specify conditions that allow for a partial training of a trained model (144, FIG. 1.2, 162, FIG. 1.3), where the offloading process described in FIG. 2.2 may only send a portion of the training data to the edge device for training. In other words, the offloading policy (166) may specify an amount of training data (160) (e.g., as a percentage) to be transmitted based on the conditions of the modular chassis manager (150) and/or the conditions of the edge network.

Figure 21:
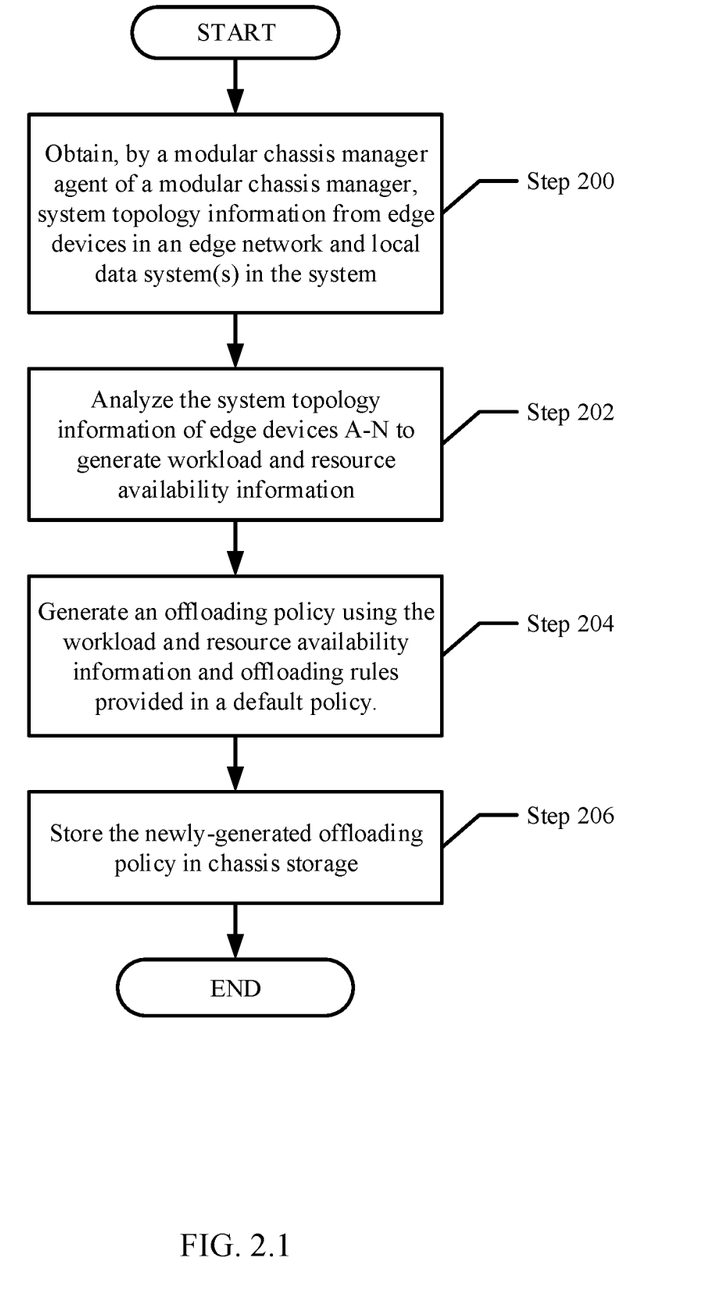

FIG. 2.1 shows a flowchart of a method for generating an offloading policy in accordance with one or more embodiments of the invention. The method may be performed by, for example, the modular chassis manager agent (152, FIG. 1.3) and the chassis storage (154, FIG. 1.3) of the modular chassis manager (150, FIG. 1.3). Other components of the system illustrated in FIGS. 1.1-1.3 may perform all, or a portion, of the method of FIG. 2.1 without departing from the invention.

While FIG. 2.1 is illustrated as a series of steps, any of the steps may be omitted, performed in a different order, include additional steps, and/or perform any or all of the steps in a parallel and/or partially overlapping manner without departing from the invention.

In Step 200, system topology information is obtained by the modular chassis manager agent. The system topology information is stored in the chassis storage of the modular chassis manager. The modular chassis manager agent obtains the system topology information from the edge devices in an edge network, from local data system(s), and/or from other components in the system seen in FIG. 1.1. The system topology information obtained by the modular chassis manager agent may include information such as the structure, organization, workload, and resource availability of the edge devices in the edge network.

In Step 202, the modular chassis manager agent analyzes the system topology information to generate information about the workload and availability of the edge devices in the edge network. The modular chassis manager agent may also analyze information such as the connectivity to the wide area network by the edge devices, sensor data for individual or multiple edge devices, information about the hardware of the edge devices, memory utilization, application and resource usage within each edge device on the edge network, etc.

In Step 204, an offloading policy is generated by the modular chassis manager using the workload and resource availability information generated in Step 202. Offloading rules provided in a default policy file may also be used when generating the offloading policy. The newly generated offloading policy may include rules for how to manage offloading work, like model training, to edge devices. The offloading policy may specify conditions to be met for the offloading to be performed. The conditions may include, for example, whether the workload of the modular chassis manager exceeds a defined threshold, an availability of the edge devices, and whether a network bandwidth between the modular chassis manager and an edge device selected for offloading is above a pre-defined threshold.

In Step 206, the newly-generated offloading policy is stored in chassis storage for future use. The offloading policy is used in the methodology described in FIG. 2.2.

FIG. 2.2 shows a flowchart of a method for obtaining trained models in accordance with one or more embodiments of the invention. The method may be performed by, for example, the modular chassis manager agent (152, FIG. 1.3) and the chassis storage (154, FIG. 1.3) of the modular chassis manager (150, FIG. 1.3). Other components of the system illustrated in FIGS. 1.1-1.3 may perform all, or a portion, of the method of FIG. 2.2 without departing from the invention.

While FIG. 2.2 is illustrated as a series of steps, any of the steps may be omitted, performed in a different order, include additional steps, and/or perform any or all of the steps in a parallel and/or partially overlapping manner without departing from the invention.

In Step 220, the edge network is monitored by the modular chassis manager to obtain telemetry data. The modular chassis manager may gather information on how the edge devices in the edge network are functioning at the time, including which edge devices are available or unavailable, or idle or active.

In Step 222, the training of a machine-learning algorithm for a hardware level failure prediction model (e.g., a trained model) is initiated by the modular chassis manager. The initiation of the training of the model may be, but is not limited to, done by an administrator of the system, or initiated at incremental periods of time defined by the administrator.

In Step 224, a determination is made about whether or not the offloading policy (discussed in more detail above in FIGS. 1.3 and 2.1) indicates a need for offloading the training. The need for offload may be primarily based on the conditions of the system in terms of the workload of the modular chassis manager and edge devices. If it is determined by the offloading policy that there is a need for offload, the method proceeds to Step 226; if it is determined by the offloading policy that there is no need for offload, the method proceeds to Step 234.

In Step 226, a determination is made about whether or not there is edge device availability, referring to whether there are any edge devices on the edge network that would be able to handle the workload of the training. If it is determined that there is edge device availability, the method proceeds to Step 228; if it is determined that there is no edge device availability, the method proceeds to Step 234.

In Step 228, following the determination made in Step 226, the edge device for offloading is selected based on the telemetry data obtained in Step 220 as well as the offloading policy generated in FIG. 2.1. This edge device may be selected based on the conditions met of the offloading policy. Said another way, if there is availability on the edge device to handle a higher workload than it was handling at the time of the determination made in Step 226, the edge device may be selected.

In Step 230, a transfer of training data from the modular chassis manager (160, FIG. 1.3) to the selected edge device storage (140, 142, FIG. 1.2) is initiated, and the selected device is instructed to perform the training using the transferred training data. The edge device may perform the prediction model training using the transferred training data from the modular chassis manager. All or a portion of the training data may be transferred based on the offloading policy.

In Step 232, the trained model is obtained and stored by the modular chassis manager from the selected edge node. In one embodiment of the invention, the modular chassis manager may obtain a plurality of trained models from a plurality of edge devices in order to have multiple sources of information about the structure and function of the edge devices in the edge network. By obtaining multiple trained models from multiple edge devices (144, FIG. 1.2) as well as generating its own models (162, FIG. 1.3) as discussed in Step 234, the modular chassis manager may be able to provide better failure prediction.

In Step 234, the trained model (162, FIG. 1.3) is generated by the modular chassis manager using training data (160, FIG. 1.3). If no edge devices are available, as determined in Step 226, the training process and generation of a trained model may have to occur on the modular chassis manager during its passive time. This trained model generation is based not only on the machine learning algorithm and historical data of device utilization, but also if the modular chassis manager is currently in an idle time period. When the modular chassis manager is not occupied with another task, i.e., system management activities, it may be available to do the model training itself as opposed to distributing the training task to edge devices on the edge network. The trained model generation using training data may be done on, but is not limited to, the modular chassis manager agent (152, FIG. 1.3) or the chassis storage (154, FIG. 1.3).

To further describe the methodology in FIGS. 2.1 and 2.2, an Example section is provided below.

EXAMPLE

Figure 3:
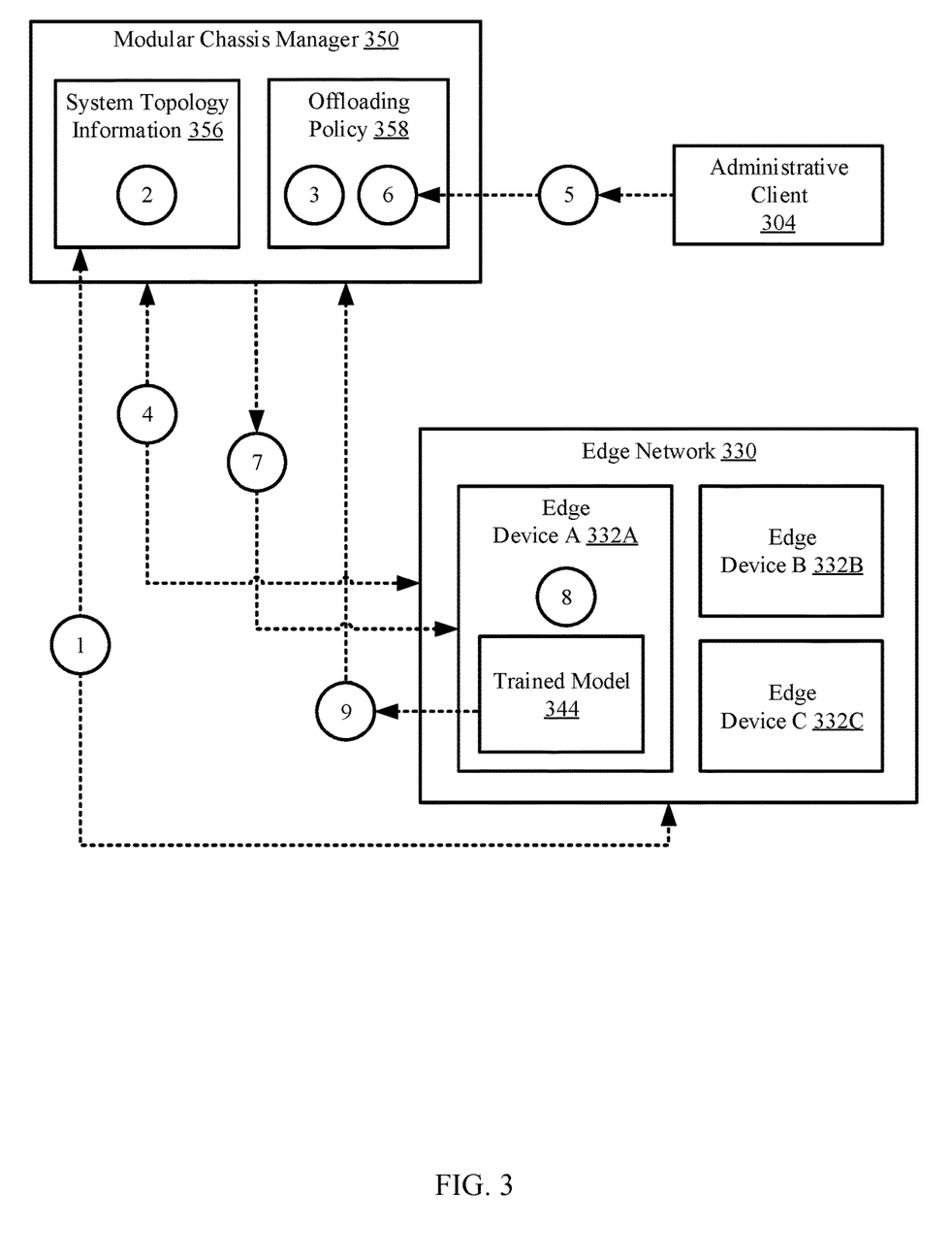
FIG. 3 shows a diagram of an example in accordance with one or more embodiments of the invention.

The following section describes an example. The example, illustrated in FIG. 3, is not intended to limit the invention. Turning to the example, consider a scenario in which a system includes a modular chassis manager offloading training tasks onto device(s) on an edge network.

Turning to FIG. 3, FIG. 3 shows a diagram of an example system. For the sake of brevity, not all components of the example system are illustrated in FIG. 3. The example system includes at least an administrative client (304), an edge network (330), and a modular chassis manager (350). The edge network (330) includes multiple edge devices (332A, 3332B, 332C). Edge device A (332A) includes a trained model (344). The modular chassis manager includes system topology information (356) and an offloading policy (358). Other components in the system depicted in FIGS. 1.1-1.3 may perform all, or a portion of the steps shown in FIG. 3 without departing from the scope of the invention.

In the following example, a sequence of operations illustrated in FIG. 3 as the circled numbers are described below using brackets.

In this methodology, the modular chassis manager is generating an offloading policy and then offloading the training of a model to an edge device A (332A). The modular chassis manager (350) is operatively connected to the edge network (330), and begins by obtaining system topology information (356) about the edge devices (332A, 3332B, 332C) [1]. Once the modular chassis manager (350) stores the system topology information of the edge devices (332A, 332B, 332C) in the edge network (330), it analyzes the information about the edge devices (332A, 332B, 332C) in order to generate information about the workload and availability of the edge devices (332A, 332B, 332C) [2]. Using this edge device availability information, an offloading policy is generated by the modular chassis manager (350) and is stored in the chassis storage, not shown in FIG. 3.

The modular chassis manager (350) continues to monitor the edge devices in the edge network (330) to obtain information about resource usage by the edge devices (332A, 332B, 332C) [4]. The edge network is consistently monitored for changes. If the offloading policy conditions are met, i.e., if the modular chassis manager is overloaded, the training of the failure prediction models may be offloaded to a selected edge device. An administrative client (304) initiates a request for the generation of the hardware failure prediction model [5]. After obtaining the request, the modular chassis manager (350) consults the offloading policy to determine whether the conditions for offloading the training of the hardware failure prediction model are met. If the conditions specified in the offloading policy (358) are met, and offloading training to an edge device is available, guidelines specified in the offloading policy (358) guide the modular chassis manager (350) to select an edge device to handle the task [6].

In this example, the edge node selected by the modular chassis manager (350) based on the conditions in the offloading policy (358) is edge device A (332A). In this example, edge devices B and C (332B, 332C) may be occupied from other tasks, busy processing other training requests, or have no computing resources available to take on additional workload such as the training. Edge device A (332A) may receive a request from the modular chassis manager (350) to begin the training process. The edge device selected will also receive training data from the modular chassis manager [7]. Once edge device A has received the training request and training data from the modular chassis manager, it may conduct the training process on the device in order to generate a trained model [8]. Once edge device A finishes generating the trained model, it sends the trained model to the modular chassis manager [9].

As discussed above, embodiments of the invention may be implemented using computing devices. Turning now to FIG. 4, FIG. 4 shows a diagram of a computing device in accordance with one or more embodiments of the invention. The computer (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth® interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) (402) may be one or more cores or micro-cores of a processor. The computer (400) may also include one or more input devices (410), such as a touchscreen, keyboard, mouse, microphone, touchpad, electronic pen, or any other type of input device. Further, the communication interface (412) may include an integrated circuit for connecting the computer (400) to a network (not shown) (e.g., a local area network (LAN), a wide area network (WAN) such as the Internet, mobile network, or any other type of network) and/or to another device, such as another computing device.

In one embodiment of the invention, the computer (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many diverse types of computing devices exist, and the aforementioned input and output device(s) may take other forms.

One or more embodiments of the invention may be implemented using instructions executed by one or more processors of the cluster manager. Further, such instructions may correspond to computer readable instructions that are stored on one or more non-transitory computer readable mediums.

One or more embodiments of the invention may improve the operation of one or more computing devices in a cluster environment. Specifically, embodiments of the invention relate to a method of providing file system storage services across a network using, for example a network file system protocol.

One or more embodiments of the invention relates to a method of leveraging existing cluster technology and their existing protocols to provide the file system storage services using NFS protocols by clients. With this technology, no additional software may be required on the NFS clients in response to the addition, removal, or otherwise scaling of cluster nodes in the cluster. Further, no change in protocol is required within the nodes in the deduplication-aware cluster. In this manner, data transfer services are provided by the cluster to clients operating using a NFS protocol despite the cluster operating in a different protocol such as DDBoost™. The NFS clients may remain agnostic to changes in the cluster, thus improving the user experience when using the deduplication-aware cluster to manage its data storage.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A system comprising:
an edge network comprising a plurality of edge devices;
a modular chassis manager, operatively connected to the edge network, programmed to:
initiate a training of a machine learning algorithm; and
in response to the initiating:
make a first determination, based on an offloading policy, that the training is to be offloaded to one of the plurality of edge devices, wherein the offloading policy is generated by the modular chassis manager using system topology information obtained from the edge network;
based on the first determination, select an edge device of the plurality of edge devices using the offloading policy;
transfer training data to the selected edge device of the plurality of edge devices;
instruct the selected edge device to perform the training using the transferred training data to generate a trained model;
obtain the generated trained model from the selected edge device;
obtain a request from an administrator a second training of the machine learning algorithm; and
in response to the obtained request:
make a second determination, based on the offloading policy, that the second training is to be offloaded to one of the plurality of edge devices;
make, after the second determination, a third determination that none of the plurality of edge devices are available for the training;
wait, based on the third determination, until the modular chassis manager is in an idle time; and
perform, during the idle time and on the modular chassis manager, the second training to generate a second trained model.

2. The system of claim 1, wherein the modular chassis manager is further programmed to:
prior to the initiating:
obtain the system topology information from the plurality of edge devices;
analyze the system topology information to generate workload and resource availability information;
generate the offloading policy using the generated workload and resource availability information; and
store the generated offloading policy.

3. The system of claim 2, wherein the offloading policy is further generated using a default policy, wherein the default policy is obtained from an administrator.

4. The system of claim 1, wherein the modular chassis manager is further programmed to:
monitor the edge network to obtain telemetry data,
wherein the selected edge device executes an application using computing resources,
wherein the obtained telemetry data is based on the execution,
wherein the first determination is further based on the obtained telemetry data.

5. The system of claim 4, wherein the obtained telemetry data comprises: computing resource usage of each of the plurality of edge devices, available storage in each of the plurality of edge devices, and a set of applications executing on each of the plurality of edge devices.

6. The system of claim 1,
wherein the system topology information comprises: information about a connection between each of the plurality of edge devices to each other, information about a connection between each of the plurality of edge devices to a global data system,
wherein the global data system stores data obtained from the edge network, and information about a connection between each of the plurality of edge devices to a local data system, and
wherein the modular chassis manager is further programmed to manage local data system servers in the local data system.

7. A non-transitory computer readable medium comprising computer readable program code, which when executed by a computer processor enables the computer processor to perform a method for managing training of a machine learning algorithm, the method comprising:
initiating, by a modular chassis manager, the training of the machine learning algorithm; and
in response to the initiating:
making a first determination, based on an offloading policy, that the training is to be offloaded to one of a plurality of edge devices in an edge network,
wherein the modular chassis manager is operatively connected to the edge network,
wherein the offloading policy is generated by the modular chassis manager using system topology information obtained from the edge network;
based on the first determination, selecting an edge device of the plurality of edge devices using the offloading policy;
transferring training data to the selected edge device of the plurality of edge devices;
instructing the selected edge device to perform the training using the transferred training data to generate a trained model;

obtaining the generated trained model from the selected edge device;

obtaining a request from an administrator a second training of the machine learning algorithm; and in response to the request:
- making a second determination, based on the offloading policy, that the second training is to be offloaded to one of the plurality of edge devices;
- making, after the second determination, a third determination that none of the plurality of edge devices are available for the training;
- waiting, based on the third determination, until the modular chassis manager is in an idle time; and
- performing, during the idle time and on the modular chassis manager, the second training to generate a second trained model.

8. The non-transitory computer readable medium of claim 7, the method further comprising:
prior to the initiating:
- obtaining the system topology information from the plurality of edge devices;
- analyzing the system topology information to generate workload and resource availability information;
- generating the offloading policy using the generated workload and resource availability information; and
- storing the generated offloading policy.

9. The non-transitory computer readable medium of claim 8, wherein the offloading policy is further generated using a default policy, wherein the default policy is obtained from an administrator.

10. The non-transitory computer readable medium of claim 7, the method further comprising:
monitoring the edge network to obtain telemetry data,
wherein the selected edge device executes an application using computing resources,
wherein the obtained telemetry data is based on the execution,
wherein the first determination is further based on the obtained telemetry data.

11. The non-transitory computer readable medium of claim 10, wherein the obtained telemetry data comprises: computing resource usage of each of the plurality of edge devices, available storage in each of the plurality of edge devices, and a set of applications executing on each of the plurality of edge devices.

12. The non-transitory computer readable medium of claim 7,
wherein the system topology information comprises: information about a connection between each of the plurality of edge devices to each other, information about a connection between each of the plurality of edge devices to a global data system,
wherein the global data system stores data obtained from the edge network, and information about a connection between each of the plurality of edge devices to a local data system, and
wherein the modular chassis manager is further programmed to manage local data system servers in the local data system.

13. A method for training a machine learning algorithm, the method comprising:
initiating, by a modular chassis manager, the training of the machine learning algorithm; and
in response to the initiating:
- making a first determination, based on an offloading policy, that the training is to be offloaded to one of a plurality of edge devices in an edge network,
wherein the modular chassis manager is operatively connected to the edge network,
wherein the offloading policy is generated by the modular chassis manager using system topology information obtained from the edge network;
- based on the first determination, selecting an edge device of the plurality of edge devices using the offloading policy;
- transferring training data to the selected edge device of the plurality of edge devices;
- instructing the selected edge device to perform the training using the transferred training data to obtain a trained model;
- obtaining the obtained trained model from the selected edge device;

obtaining a request from an administrator a second training of the machine learning algorithm; and in response to the request:
- making a second determination, based on the offloading policy, that the second training is to be offloaded to one of the plurality of edge devices;
- making, after the second determination, a third determination that none of the plurality of edge devices are available for the training;
- waiting, based on the third determination, until the modular chassis manager is in an idle time; and
- performing, during the idle time and on the modular chassis manager, the second training to generate a second trained model.

14. The method of claim 13, further comprising:
prior to the initiating:
- obtaining the system topology information from the plurality of edge devices;
- analyzing the system topology information to generate workload and resource availability information;
- generating the offloading policy using the generated workload and resource availability information; and
- storing the generated offloading policy,
wherein the generated offloading policy is further generated using a default policy, wherein the generated default policy is obtained from an administrator.

15. The method of claim 13, further comprising:
monitoring the edge network to obtain telemetry data,
wherein the selected edge device executes an application using computing resources,
wherein the obtained telemetry data is based on the execution,
wherein the first determination is further based on the obtained telemetry data.

16. The method of claim 15, wherein the obtained telemetry data comprises: computing resource usage of each of the plurality of edge devices, available storage in each of the plurality of edge devices, and a set of applications executing on each of the plurality of edge devices.

17. The method of claim 13,
wherein the system topology information comprises: information about a connection between each of the plurality of edge devices to each other, information about a connection between each of the plurality of edge devices to a global data system,
wherein the global data system stores data obtained from the edge network, and information about a connection between each of the plurality of edge devices to a local data system, and wherein the modular chassis manager is further programmed to manage local data system servers in the local data system.

\* \* \* \* \*